C. C. WORTHINGTON.
GANG LAWN MOWER.
APPLICATION FILED AUG. 4, 1916. RENEWED JULY 30, 1921.
1,398,481.
Patented Nov. 29, 1921.
2 SHEETS—SHEET 1.
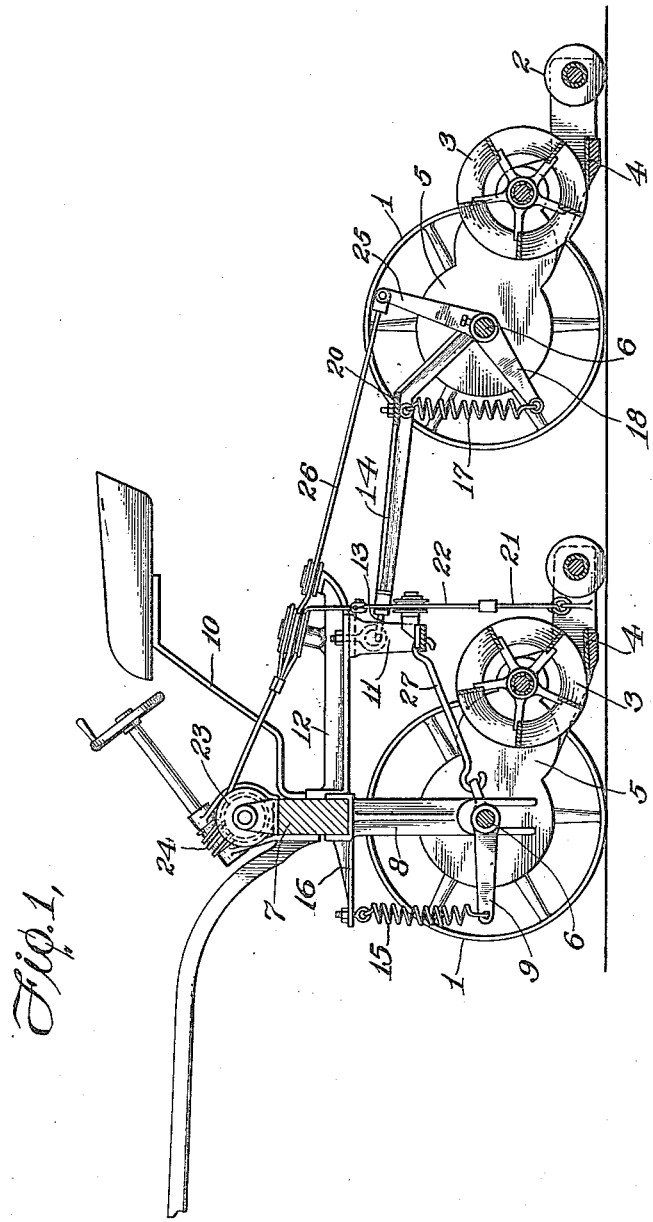

C. C. WORTHINGTON.
GANG LAWN MOWER.
APPLICATION FILED AUG. 4, 1916. RENEWED JULY 30, 1921.
1,398,481.
Patented Nov. 29, 1921.
2 SHEETS—SHEET 2.
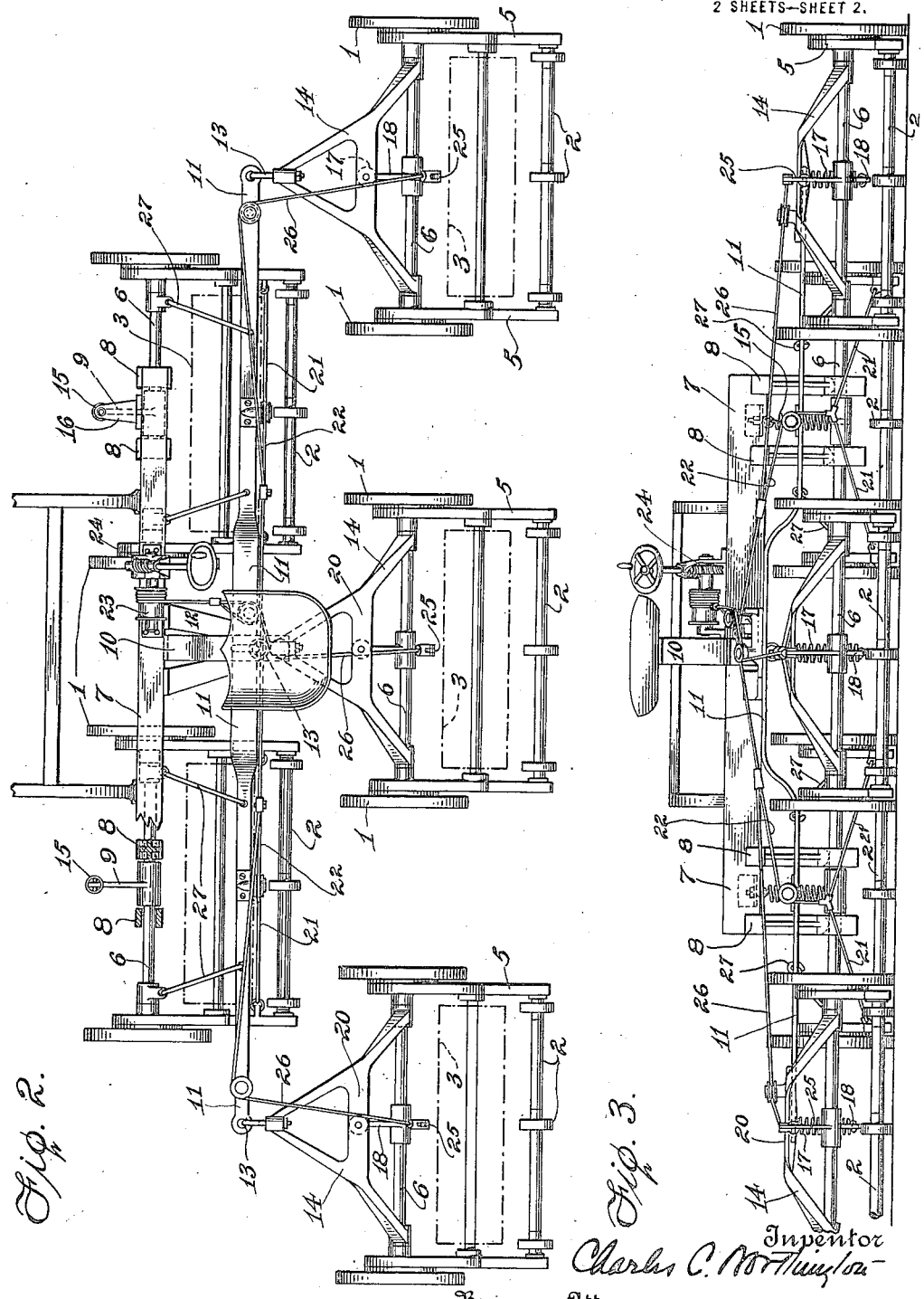

UNITED STATES PATENT OFFICE.

CHARLES C. WORTHINGTON, OF DUNFIELD, NEW JERSEY, ASSIGNOR TO SHAWNEE MOWER COMPANY, OF NEW YORK, N. Y., A CORPORATION OF PENNSYLVANIA.

GANG LAWN-MOWER.

1,398,481. Specification of Letters Patent. Patented Nov. 29, 1921.

Application filed August 4, 1916, Serial No. 113,037. Renewed July 30, 1921. Serial No. 488,681.

*To all whom it may concern:*

Be it known that I, CHARLES C. WORTHINGTON, a citizen of the United States, residing in Dunfield, New Jersey, have invented the following described Improvements in Gang Lawn-Mowers.

The improvements relate to gang lawn mowers having more than three lawn mower units arranged in overlapping positions and consist in the general organization and means of uniting and spacing the mower units in such gangs, and in certain incidental and collateral features, as herein disclosed, whereby such machines are adapted to operate efficiently on irregular or undulating ground surface to cut a very wide swath without injuring the lawn surface, and whereby various other advantages are obtained or made available some of the features of the invention being also applicable to three gang mowers. This application is in part a continuation of my copending application, filed November 26, 1913, Patent No. 1,210,879.

In the accompanying drawings, Figure 1 represents the preferred form of the invention in side elevation, with parts in section;

Fig. 2 is a top plan of Fig. 1 with certain parts broken away and in section; and Fig. 3 is a rear elevation of Fig. 2.

The mower units shown in the drawings may be assumed to be of ordinary lawn mower construction having ground wheels or rolling elements 1 and cutter mechanism driven by them. Each unit is supported on the ground by means of its ground wheels and also, normally, by a rear support shown in the present case as a series of small rollers 2. The cutter mechanism comprises a rotary fly knife 3 coöperating with a fixed bed knife 4 and driven by one or both of the rolling elements 1 through gear-trains housed in the side plates 5. The latter are joined together by the bed knife structure and also by one or more cross-rods 6 constituting therewith the frame of the lawn mower unit. In the type of unit shown the cross-rod or axle 6 coincides with the axis of the ground wheels; such arrangement is preferred but not necessary. The several units of the gang are arranged in front and rear transverse rows, the front row consisting in the present case of two units in alinement with each other, and the rear row consisting of three units, one in the middle adapted to cut the grass left between the two front units, and two other units on each side to cut swaths overlapping and extending laterally beyond the swaths of the front units, thus giving a total swath nearly equal to the aggregate width of five individual swaths.

The main frame by which the units are spaced and united and which may also carry the operator and the mower adjusting means, is supported parallel to and preferably directly over the row of front units, and comprises a front cross-beam 7 made of wood or light metal construction, and a rear beam member 11 connected parallel thereto by a cross piece 12. These beam members are supported in the position stated by two pairs of bearing brackets 8 directly affixed to the front beam near its ends and herein shown as forked at their lower extremities so that they can straddle and rest on the cross-rods 6 of the front units themselves, one fork being placed on each side of the hub of a lever 9 which is fast to the center of each cross-rod. This mounting of the main frame has the advantage of simplicity in that the same wheels that support the frames of the front units also support the main frame, and the weight of the latter is thus imparted to the cutter-driving elements to improve their tractive engagement with the lawn while the fork slots of the brackets accommodate the individual tilting or oscillating of the units in the vertical planes of their own wheel axes, but it is only essential that the bearing brackets shall be supported so that the main frame can be properly advanced over the ground and except as specifically mentioned in the appended claims there is no limitation to the mounting of said frame on the lawn mower units. As herein shown, and preferred, the front beam member is located above and in front of the axes of the fly-knives of the front row units and the rear beam 11 is above and in rear of such axes and is longer than the front beam. The units of the front row are held to the main frame by means of connecting members 27 in the form of a pair of links for each unit. These connecting members 27 are jointed to holes in the rear beam member and to perforated lugs formed on each unit frame near its ground wheels so that while they are in effect parts of the main framework, they do not support the beam members, being relatively movable with reference thereto, but they keep the units of the front row at all times substantially parallel to the beam members, and to each other, i. e. parallel to the transverse axis of the main frame or the vertical planes of the beams, and permit the independent tilting movement of each unit parallel to such planes, and also the vertical oscillation of the unit frames about the axes of their respective ground wheels. They may have the form of struts or tensile connections as preferred but are herein shown as strut-links, which push the units rather than pull them. When the machine is horse-drawn, the operator's seat is mounted on a flexible post 10 secured at the center of the cross beam 7 and the shafts for the horse or horses are connected to the same cross-beam.

The rear mower units, arranged with their several ground wheels in a transverse row as above stated, are connected to the rear beam member 11 by means of other unit-connecting members, each in the form of a small draft frame 14, herein shown as of triangular or A shape. These connecting frames are flexibly jointed at their forward, apical ends to laterally separated points on the rear beam by means of the detachable shackles 13, and they are hinged or ring-jointed at their rear, wide ends to the side plates or the cross rods of the rear mower units. By this connection, which is in effect a universal joint, each rear unit is drawn forwardly by the main frame in trailing relation and overlapping the front units. They may each swing freely and independently in lateral directions as when the machine is turning corners and may tilt, independently, in the vertical planes of their wheel axes and oscillate about said axis, and may also each operate on ground surface of a different elevation, thus adapting the gang to accommodate every possible configuration of lawn surface.

The unit connecting members for the rear units, like those for the front units are supported in part by the units themselves and in part by the main frame, but afford no support to the latter which is held upright, after the manner of an ordinary sulky, solely by its attachment to the propelling means, and not by attachment to the rear units.

The cutter mechanisms of all of the units are yieldingly urged or held toward the ground surface by means of springs, which serve to keep them from jumping and skipping patches of grass. The springs for the front mowers are marked 15 and are connected between the lever arms 9 above referred to and the spring brackets 16 by means of a bolt and nut or other adjustment device. The location of the arm 9 between the bearing forks 8 provides substantially constant spring action irrespective of the unit's angle of tilt. For the rear mowers, similar springs 17 are connected to the lever arms 18 fast to the cross-rods 6 and adjustably attached at their upper ends to the cross web 20 of the draft frame 14. The tension of these springs prevents the jumping of the rear units.

The cutter mechanisms of all the units are arranged to be raised from the ground when necessary and to such an extent as may be required, by the operation of controlling agencies mounted on the main frame adjacent the operator's seat. For this purpose the front units are supplied with bridle chains 21 connected with a cable 22 running over appropriate sheaves on the rear beam member 11 to a drum 23 mounted on the front beam 7 and adapted to be rotated by the operator through the hand wheel and worm gear couple 24 or by any other suitable power appliance or appliances. The cutters of the rear units are adapted to be lifted upwardly and against the tension of their springs 17 by means of lifter arms 25 fast to the frames or cross-rods 6 and connected by cables 26 with the same winding drum 23. The cutter mechanisms of the gang are thus raised from the ground by the operation of a single hand wheel, which is preferred, but it will be apparent that separate lifting means could be provided for individual units or groups of units if desired and it will also be apparent that the lifting mechanism shown enables the cutters to be raised and held at any elevation desired with but very little effort on the part of the operator. It will be understood also that the design of the means for uniting and spacing the units as herein shown is merely exemplary of the principle of the invention and that various changes in the shape, relative arrangement and form of said frame work, including the draft frames of the trailing units, may be resorted to without departing from the principle of this invention.

Claims:

1. A gang lawn mower comprising front and rear transverse rows respectively containing a plurality of lawn mower units, each unit having a cutter-driving rolling element or ground wheel, means for uniting and spacing said units comprising a main frame and unit-connecting members in non-supporting and relatively movable relation to said main frame serving to hold the units of the front row parallel to the transverse axis of the main frame and other unit connecting members serving to connect the units of the rear row to said frame, and all of said members being organized to permit the tilting of the units in the vertical planes of their respective wheel-axes.

2. A gang lawn mower comprising front and rear rows respectively containing a plurality of lawn mower units, said units having cutter-driving rolling elements or ground wheels, means for uniting and spacing said units comprising a main frame having bearing brackets whereby it is supported over and parallel to the front row of units, unit connecting members in non-supporting and relatively movable relation to said main frame holding said front row units with their wheel axes parallel to said main frame and free to tilt in the vertical planes of such axes, and flexible joint means connecting the units of the rear row to said main frame and permitting said rear units to assume different vertical and horizontal angles with reference to said main frame.

3. A gang lawn mower comprising a plurality of ground wheels or rolling elements all disposed in substantial alinement in a row transverse to the gang, a plurality of lawn mower unit frames and a main frame supported by rolling elements in said row, unit-connecting members in non-supporting and relatively movable relation to said main frame adapted to connect and hold said unit frames parallel to the vertical plane of said row while permitting the tilting of said units in said vertical plane, another transverse row of ground wheels or rolling elements, a plurality of lawn mower unit frames supported thereon in overlapping relation to the first mentioned units and flexible joint means connecting the same to said main frame and permitting said units to assume different vertical transverse angles with respect thereto.

4. A gang lawn mower comprising a plurality of ground wheels or rolling elements, all disposed in the front row of the gang, a plurality of front lawn mower unit frames and a main frame supported by wheels or rolling elements in said row, unit-connecting members in non-supporting and relatively movable relation to said main frame adapted to connect and hold said unit frames parallel to the vertical plane of said main frame while permitting the tilting of said units in said vertical plane, a rear row of ground wheels or rolling elements, a plurality of rear lawn mower unit frames supported thereon and flexible joint means connecting said frames to said main frame and permitting said rear units to tilt in the planes of their wheel axes with respect to each other and said main frame.

5. A gang lawn mower comprising front and rear rows each containing a plurality of lawn mower units and each unit having a cutter-driving rolling element or ground wheel, means for uniting and spacing said units comprising a main frame and unit connecting members in non-supporting and relatively movable relation to said frame, certain of said connecting members serving to hold the units of the front row parallel to the vertical plane of the row and permitting tilting thereof parallel to said plane, and the other of said connecting members being attached to said main frame at laterally separated points thereon and connecting all the units of the rear row to said frame so that they each have independent movement in vertical and also horizontal planes.

6. A gang lawn mower comprising front and rear transverse rows each containing a plurality of lawn mower units, said units having cutter-driving ground wheels or rolling elements, means for uniting and spacing said units comprising a main frame having bearing brackets whereby it is supported parallel to the front row of units, unit connecting members in non-supporting and relatively movable relation to said main frame holding said front row units with their wheel axes substantially parallel to said row and free to tilt in the vertical planes of such axes, a unit-connecting frame individual to each unit of the rear row and pivotal means for attaching the same to laterally separated points on said main frame adapted and permitting individual tilting movement to said rear units.

7. A gang lawn mower comprising front and rear rows of lawn mower units having cutter-driving rolling elements or ground wheels, each row containing a plurality of said units, means for uniting and spacing the units comprising front and rear transverse beam members parallel and adjacent to the front row, unit connecting members for each of the units of the front row arranged in non-supporting relation to said beam members and adapted to hold said units parallel thereto and permit them to assume different vertical angles with reference thereto, and rearwardly-extending connecting members for the units of the rear row connecting them to said rear beam member and adapted to permit said rear units to tilt in the vertical planes of their own wheel axes.

8. A gang lawn mower comprising front and rear rows of lawn mower units having cutter-driving rolling elements or ground wheels, each row containing a plurality of said units, means for uniting and spacing the units comprising front and rear transverse beam members having bearing brackets supporting them parallel to the front row and in front and rear respectively of the cutter mechanisms of the units of said row, unit connecting members in non-supporting relation to said beam members adapted to hold the units of the front row parallel to said beam members and permit them to tilt in the vertical planes of their own wheel axes, and flexible means connecting the units of the rear row to laterally separated points on said rear beam member.

9. A gang lawn mower comprising front and rear transverse rows respectively containing a plurality of lawn mower units each unit having cutter-driving rolling elements or ground wheels, means for uniting and spacing said units comprising a main frame and unit-connecting members in non-supporting and relatively movable relation to said main frame serving to hold the units of the front row parallel to the transverse axis of the main frame and free to tilt in the vertical planes of their own wheel axes, unit-connecting members serving to connect the units of the rear row to said frame, and means extending from said main frame to each unit in the rear row for lifting the cutter mechanism thereof from the ground.

10. A gang lawn mower comprising front and rear rows respectively containing a plurality of lawn mower units, each unit having a cutter-driving rolling element or ground wheel, means for uniting and spacing said units comprising a main frame and unit connecting members in non-supporting and relatively movable relation to said frame serving to hold the units of the front row parallel to the transverse axis of the main frame and permit transverse tilting thereof, unit-connecting frames attached to said main frame at laterally separated points thereon and serving to connect the units of the rear row to said main frame and permit independent angular movement of said rear units and means carried on said unit-connecting frames for controlling the elevation of the cutter mechanisms of the rear units.

11. A gang lawn mower comprising a main frame, a row of trailing lawn mower units each having ground wheels and rotary cutters driven thereby and each of said units having a draft frame and a universal-joint connection between each draft frame and the main frame permitting said units to individually assume different horizontal angles with respect to said main frame and different vertical angles with respect to each other.

12. A gang lawn mower comprising a main frame parallel to a row of front mower units each having ground wheels and rotary cutters driven thereby and a rear unit in non-supporting relation to the main frame and means supplementing the gravity of said rear unit for resiliently pressing the cutter mechanism thereof toward the ground.

13. A gang lawn mower comprising a main frame, a row of front mower units connected thereto having ground wheels and rotary cutters in combination with a rear mower unit connected in non-supporting relation to the main frame, said rear unit comprising ground wheels and rotary cutter mechanism driven thereby and a lifter lever attached to the frame of said unit adapted to lift the cutter mechanism thereof from the ground.

14. A gang lawn mower comprising a main frame, a row of front mower units having ground wheels and rotary cutters driven thereby in combination with a rear mower unit in non-supporting, trailing relation to the main frame, said rear unit comprising ground wheels and rotary cutter mechanism driven thereby, a lever fast to the frame of said rear unit for lifting the cutter mechanism thereof from the ground, and an operating connection extending from said main frame to said lifter lever.

15. In a gang lawn mower a series of front mower units having ground wheels and rotary cutters driven thereby, a main frame carried by said units and connected thereto by means permitting the same to tilt vertically according to undulations in the lawn surface, a plurality of rear units arranged in a transverse row and means connecting the same in non-supporting relation to the main frame and permitting them to tilt vertically and assume different horizontal angles with respect to said main frame.

16. In a gang lawn mower, a series of front mower units having ground wheels and rotary cutters driven thereby, a main frame having draft means and mounted sulky-fashion on said front units and connected thereto by means holding said units parallel to said frame and permitting them to tilt vertically according to undulations in the lawn surface, and a rear mower unit connected in trailing relation to the main frame and being also free to tilt vertically.

17. A gang lawn mower comprising a row of front units each comprising ground wheels and rotary cutter mechanism driven thereby and a main frame carried sulky-fashion on said front units and having draft means extending forwardly therefrom, in combination with a row of rear units flexibly connected to the main frame so as to be individually adapted to tilt in the vertical planes of their own wheel axes.

18. In a gang lawn mower, a series of front mower units each having ground wheels and rotary cutters driven thereby, a main frame mounted centrally on said front units and connecting members permitting said units to tilt vertically to accommodate undulations of the lawn surface and a rear unit flexibly connected to said main frame.

19. A gang lawn mower comprising front and rear rows of lawn mower units having cutter-driving rolling elements or ground wheels, each row containing a plurality of said units, means for uniting and spacing the units comprising front and rear transverse beam members having bearing brackets supporting them parallel to the front row and in front and rear respectively of the cutter mechanisms of the units of said row, unit connecting members in non-supporting relation to said beam members adapted to hold the units of the front row parallel to said beam members and permit them to tilt in the vertical planes of their own wheel axes.

20. A gang lawn mower comprising a main frame carried on a row of front mower units, and including a rear beam member, in combination with mower units connected to laterally separated points of said member.

21. A gang lawn mower comprising a main frame supported parallel to a row of front mower units and comprising a rear beam member and a row of mower units connected in non-supporting trailing relation to said member.

22. A gang lawn mower comprising front and rear rows of mower units each including ground wheels and rotary cutters, a main frame carried sulky-fashion on the front row, and having flexible connections to the rear row and means mounted on the main frame for lifting the cutters of all the units from the ground.

23. A gang lawn mower comprising a row of front mower units, a sulky type frame, and means for supporting the same comprising a pair of spaced bearing bracket members engaging the frame of each unit near the center thereof and permitting tilting movement of the said unit with respect to said frame, in combination with a rear mower unit, a draft frame therefor and a joint connection between said draft frame and the sulky frame, permitting said rear unit to assume different horizontal angles with reference to the front mower units.

24. A gang lawn mower comprising a row of mower units, a sulky type frame, and means supporting the same thereon which permit said units to tilt vertically with respect to said frame.

25. A gang lawn mower comprising a transverse row of mower units each individually adapted to tilt vertically, a main frame mounted over said row and comprising transverse beam members and a pair of links connected to one of said beam members and to opposite sides of each unit and holding the same parallel to said main frame, and a transverse row of units flexibly connected to said main frame in rear of the aforesaid units.

26. A gang lawn mower comprising a plurality of mower units, a main frame, and means for supporting the same on said units comprising bearing brackets carried by the main frame and engaging the frame of each unit on opposite sides of the center thereof and permitting tilting movement thereof with respect to said main frame, and a lever secured to the frame of said unit between the points of engagement with said supporting members, and a connection between said lever and the main frame.

27. In a gang lawn mower, the combination with a main frame including a transverse beam member, a series of trailing lawn mower units and a universal joint connecting each of the said units to said member, said joint permitting the units to assume different vertical angles with respect to said member.

28. A gang lawn mower composed of more than three lawn mower units, each unit having a cutter-driving rolling element or ground wheel and said units being arranged in front and rear transverse rows, each row containing a plurality of said units, a main frame and means for connecting the units thereto adapted to permit each unit to tilt in the vertical plane of its own wheel axis independently of all the other units.

29. A gang lawn mower composed of transverse rows of lawn mower units having cutter-driving rolling elements or ground wheels, each row containing a plurality of said units, a main frame and means for connecting the units thereto adapted to permit each unit to tilt in the vertical plane of its own wheel axis independently of all the other units and permitting the rear row of units to assume varying angles in a lateral direction with reference to said frame.

30. A gang lawn mower composed of transverse rows of lawn mower units each having front and rear rolling elements supporting it on the ground, each row containing a plurality of said units, a frame and means for connecting said units thereto adapted to permit each unit to tilt in a vertical transverse plane independently of all the other units, and permitting one row of units to assume varying angles in a lateral direction with reference to the said frame, and means for lifting and holding one of the rolling elements of each unit elevated from the ground.

31. A gang lawn mower composed of transverse rows of lawn mower units each having front and rear rolling elements by which it is supported on the ground and containing cutter mechanism driven by one of said elements, a frame comprising a transverse beam member, connecting members for holding all the units in one of said rows parallel to said beam member and individually free to tilt in vertical planes, connecting members for holding the units of another row with freedom to tilt in the vertical planes of their respective rolling elements, and means for supporting the cutter mechanism of the units with one of their said supporting rolling elements elevated from the ground.

In testimony whereof I have signed this specification.

CHARLES C. WORTHINGTON.